US008838971B2

(12) United States Patent
Brusilovsky et al.

(10) Patent No.: US 8,838,971 B2
(45) Date of Patent: Sep. 16, 2014

(54) MANAGEMENT OF PUBLIC KEYS FOR VERIFICATION OF PUBLIC WARNING MESSAGES

(75) Inventors: Alec Brusilovsky, Naperville, IL (US); Violeta Cakulev, Millburn, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 150 days.

(21) Appl. No.: 13/351,058

(22) Filed: Jan. 16, 2012

(65) Prior Publication Data
US 2013/0185561 A1    Jul. 18, 2013

(51) Int. Cl.
*H04L 9/32* (2006.01)
*H04L 9/30* (2006.01)
*H04W 4/22* (2009.01)

(52) U.S. Cl.
CPC .............. *H04W 4/22* (2013.01); *H04L 9/3073* (2013.01)
USPC ........... 713/170; 713/168; 713/171; 380/270; 380/278; 455/404.1

(58) Field of Classification Search
CPC ........... H04W 4/22; H04W 4/02; H04W 4/06; H04W 12/08; H04W 12/06; H04L 63/0823; H04L 9/28; H04L 9/32; H04L 63/062; H04L 9/3073; H04L 9/0866
USPC .................. 713/170, 168, 171; 380/270, 278; 370/310, 331, 270; 455/458, 466, 455/404.1, 410; 709/203, 207; 726/10
See application file for complete search history.

(56) References Cited

U.S. PATENT DOCUMENTS

| | | |
|---|---|---|
| 2009/0296688 A1 | 12/2009 | Bakker et al. |
| 2010/0099439 A1 | 4/2010 | Aghili et al. |
| 2010/0115275 A1 | 5/2010 | Suh et al. |

(Continued)

FOREIGN PATENT DOCUMENTS

| | | |
|---|---|---|
| WO | 2011/123919 A1 | 10/2011 |
| WO | PCT/US2012/070637 | 4/2013 |
| WO | PCT/US2012/071017 | 7/2013 |

OTHER PUBLICATIONS

3GPP TS 33.401 V9.4.0 (Jun. 2010) 3rd Generation Partnership Project; Technical Specification Group Services and System Aspects; 3GPP System Architecture Evolution; Security Architecture (Release 9).*

(Continued)

*Primary Examiner* — Amare F Tabor
*Assistant Examiner* — Noura Zoubair
(74) *Attorney, Agent, or Firm* — Ryan, Mason & Lewis, LLP

(57) ABSTRACT

Techniques are disclosed for managing one or more public keys used for verification of one or more messages transferred over a communication network associated with a public warning system. In one example, a method comprises the following steps. A computing device of a communication network obtains key material for at least one source of a message generated for a public warning system. The computing device also obtains an identity of the source. A public key is computed by the computing device from the key material and the identity of the source. The public key is thus useable by the computing device to verify a message received from the source that is digitally signed using a corresponding private key of the source. In one example, the computing device comprises user equipment.

16 Claims, 5 Drawing Sheets

(56) References Cited

U.S. PATENT DOCUMENTS

| | | |
|---|---|---|
| 2010/0293595 A1 | 11/2010 | Naslund et al. |
| 2011/0028120 A1 | 2/2011 | Wu |
| 2011/0099281 A1 | 4/2011 | Bakker et al. |
| 2011/0170517 A1 | 7/2011 | Bakker et al. |
| 2012/0297473 A1* | 11/2012 | Case et al. .................. 726/10 |

OTHER PUBLICATIONS

Durresi et al. "Secure emergency communication of cellular phones in ad hoc mode", ScienceDirect Ad Hoc Networks, Jul. 5, 2006, pp. 126-133.*

3GPP, "3rd Generation Partnership Project; Technical Specification Group Services and System Aspects; Public Warning System (PWS) Requirements (Release 11)," 3GPP TS 22.268 V11.3.0, Dec. 2011, 15 pages.

3GPP, "3rd Generation Partnership Project; Technical Specification Group Services and System Aspects; General Packet Radio Service (GPRS) Enhancements for Evolved Universal Terrestrial Radio Access Network (E-UTRAN) Access (Release 9)," 3GPP TS 23.401 V9.5.0, Jun. 2010, 259 pages.

3GPP, "3rd Generation Partnership Project; Technical Specification Group Core Network and Terminals; Non-Access-Stratum (NAS) Protocol for Evolved Packet System (EPS); Stage 3 (Release 8)," 3GPP TS 24.301 V8.1.0, Mar. 2009, 250 pages.

3GPP, "3rd Generation Partnership Project; Technical Specification Group Radio Access Network; UTRAN Iu-BC Interface: Service Area Broadcast Protocol (SABP) (Release 10)," 3GPP TS 25.419 V10.2.0, Sep. 2011, 78 pages.

3GPP, "3rd Generation Partnership Project; Technical Specification Group GSM/EDGE Radio Access Network; Base Station Controller—Cell Broadcast Centre (BSC-CBC) Interface Specification; Cell Broadcast Service Protocol (CBSP) (Release 9)," 3GPP TS 48.049 V1.0.0, Sep. 2009, 42 pages.

3GPP Organizational Partners, 3rd Generation Partnership Project; Technical Specification Group Services and System Aspects; Public Warning System (PWS) Requirements (Release 11): 3GPP TS 22.268 V11.0.0 , (Dec. 2010), 13 pages.

D. Forsberg et al., "LTE Security," Wiley: Jul. 2010, Chapter 8, pp. 127-146.

Alcatel-Lucent., "Alcatel-Lucent-BMC: Broadcast Message Center, Release 2.0," Jun. 2010, 3 pages.

P. Jiang et al., "Publish/Subscribe Delay-Tolerant Message-Oriented Middleware for Resilient Communication," IEEE Communications Magazine, Sep. 2011, pp. 124-130, vol. 49, No. 9.

R. Sakai et al., "Cryptosystems Based on Pairing," Symposium on Cryptography and Information Security, Jan. 26-28, 2000, 6 pages.

* cited by examiner

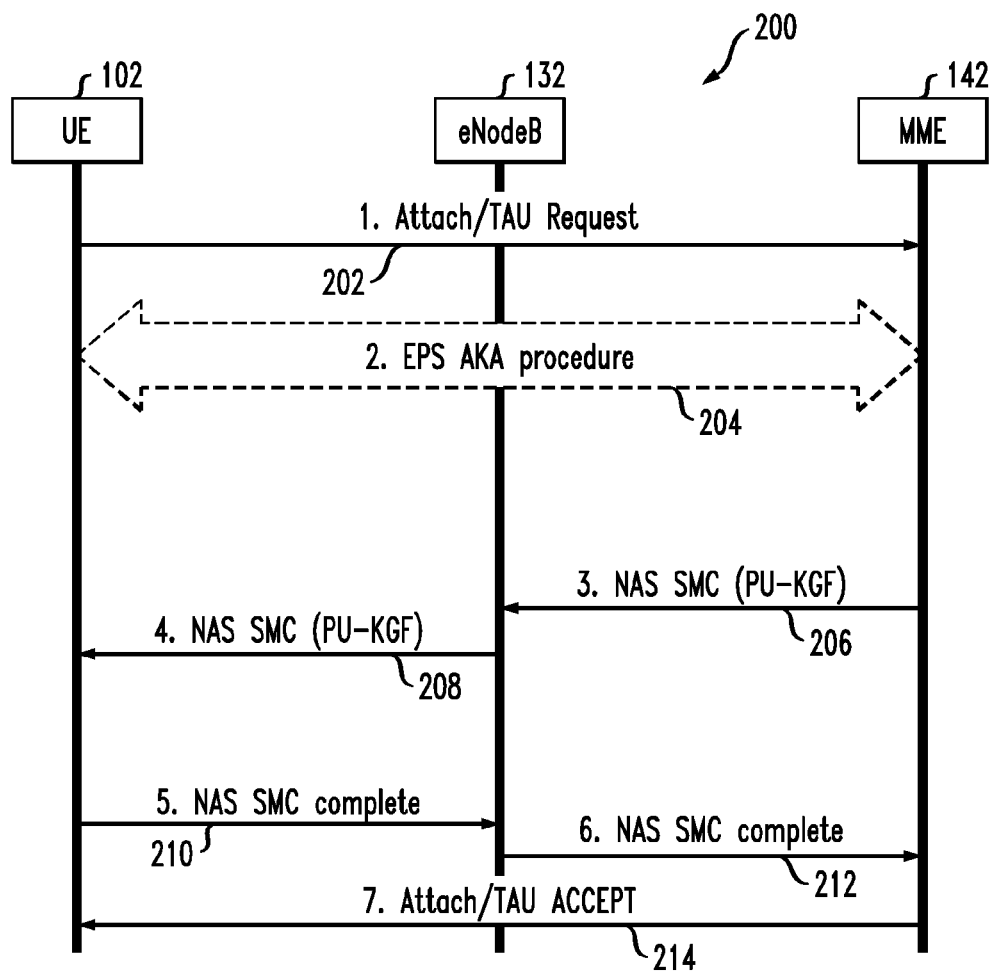

FIG. 2B

SECURITY MODE COMMAND 220

| INFORMATION ELEMENT | TYPE/REFERENCE |
|---|---|
| 222 — PROTOCOL DISCRIMINATOR | PROTOCOL DISCRIMINATOR TS 24.301, CLAUSE 9.2 |
| 224 — SECURITY HEADER TYPE | SECURITY HEADER TYPE TS 24.301, CLAUSE 9.3.1 |
| 226 — SECURITY MODE COMMAND MESSAGE IDENTIFY | MESSAGE TYPE TS 24.301, CLAUSE 9.8 |
| 228 — SELECTED NAS SECURITY ALGORITHMS | NAS SECURITY ALGORITHMS TS 24.301, CLAUSE 9.9.3.23 |
| 230 — NAS KEY SET IDENTIFIER | NAS KEY SET IDENTIFIER TS 24.301, CLAUSE 9.9.3.21 |
| 232 — SPARE HALF OCTET | SPARE HALF OCTET TS 24.301, CLAUSE 9.9.2.9 |
| 234 — REPLAYED UE SECURITY CAPABILITIES | UE SECURITY CAPABILITY TS 24.301, CLAUSE 9.9.3.36 |
| 236 — IMEISV REQUEST | IMEISV REQUEST TS 24.301, CLAUSE 9.9.3.18 |
| 238 — REPLAY NONCE UE | NONCE TS 24.301, CLAUSE 9.9.3.25 |
| 240 — NONCE MME | NONCE TS 24.301, CLAUSE 9.9.3.25 |
| 242 — PU-KGF | PUBLIC KEY OF KEY GENERATION FUNCTION |

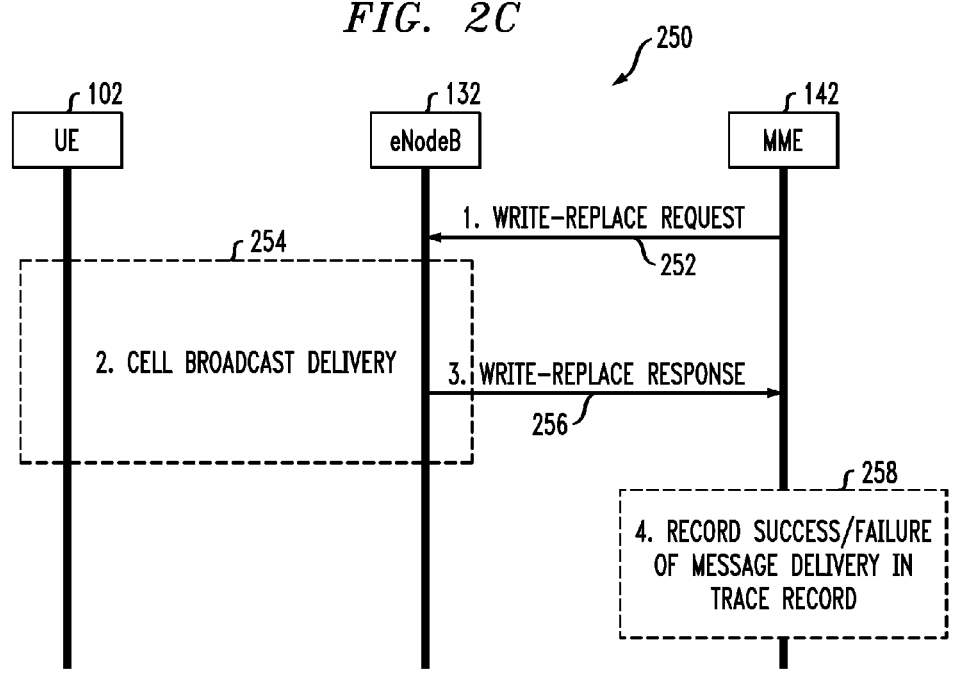
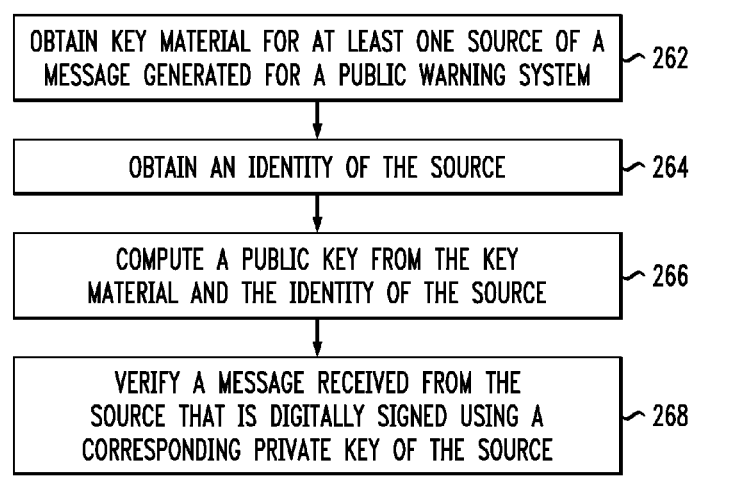

MANAGEMENT OF PUBLIC KEYS FOR VERIFICATION OF PUBLIC WARNING MESSAGES

CROSS REFERENCE TO RELATED APPLICATION

The present application is related to the U.S. patent application Ser. No. 13,351,053, entitled "Management of User Equipment Security Status for Public Warning System," filed concurrently herewith, commonly assigned herewith, and incorporated by reference herein.

FIELD

The field relates generally to communication networks, and more particularly to public warning systems associated with such communication networks.

BACKGROUND

This section introduces aspects that may help facilitate a better understanding of the inventions. Accordingly, the statements of this section are to be read in this light and are not to be understood as admissions about what is prior art or what is not prior art.

The Third Generation Partnership Project (3 GPP™) has published a technical specification, TS 22.268 version 11.3.0 (dated 2011-12), the disclosure of which is incorporated in its entirety by reference herein, describing general requirements for a Public Warning System (PWS) in a 3 GPP™ communication network.

As disclosed in TS 22.268, there has been an interest to ensure that the public has the capability to receive timely and accurate alerts, warnings and critical information regarding disasters and other emergencies irrespective of what communications technologies they use. As has been learned from disasters such as earthquakes, tsunamis, hurricanes and wild fires; such a capability is essential to enable the public to take appropriate action to protect their families and themselves from serious injury, or loss of life or property. This is what the Public Warning System is intended to do.

SUMMARY

Embodiments of the invention provide techniques for managing one or more public keys used for verification of one or more messages transferred over a communication network associated with a public warning system.

In one embodiment, a method comprises the following steps. A computing device of a communication network obtains key material for at least one source of a message generated for a public warning system. The computing device also obtains an identity of the source. A public key is computed by the computing device from the key material and the identity of the source. The public key is thus useable by the computing device to verify a message received from the source that is digitally signed using a corresponding private key of the source. In one embodiment, the computing device comprises user equipment.

Advantageously, illustrative embodiments of the invention provide for less complex key distribution, including ease in adding new PWS source public keys and in performing key revocation.

These and other features and advantages of the present invention will become more apparent from the accompanying drawings and the following detailed description.

BRIEF DESCRIPTION OF THE DRAWINGS

FIG. 2A is a diagram of a methodology for managing public key distribution according to an embodiment of the invention.

FIG. 2B is a diagram of an example of a control plane message according to an embodiment of the invention.

FIG. 2C is a diagram of a methodology for managing public warning system identity distribution according to an embodiment of the invention.

FIG. 2D is a diagram of a methodology for public key and identity management according to an embodiment of the invention.

DETAILED DESCRIPTION

Figure 1:
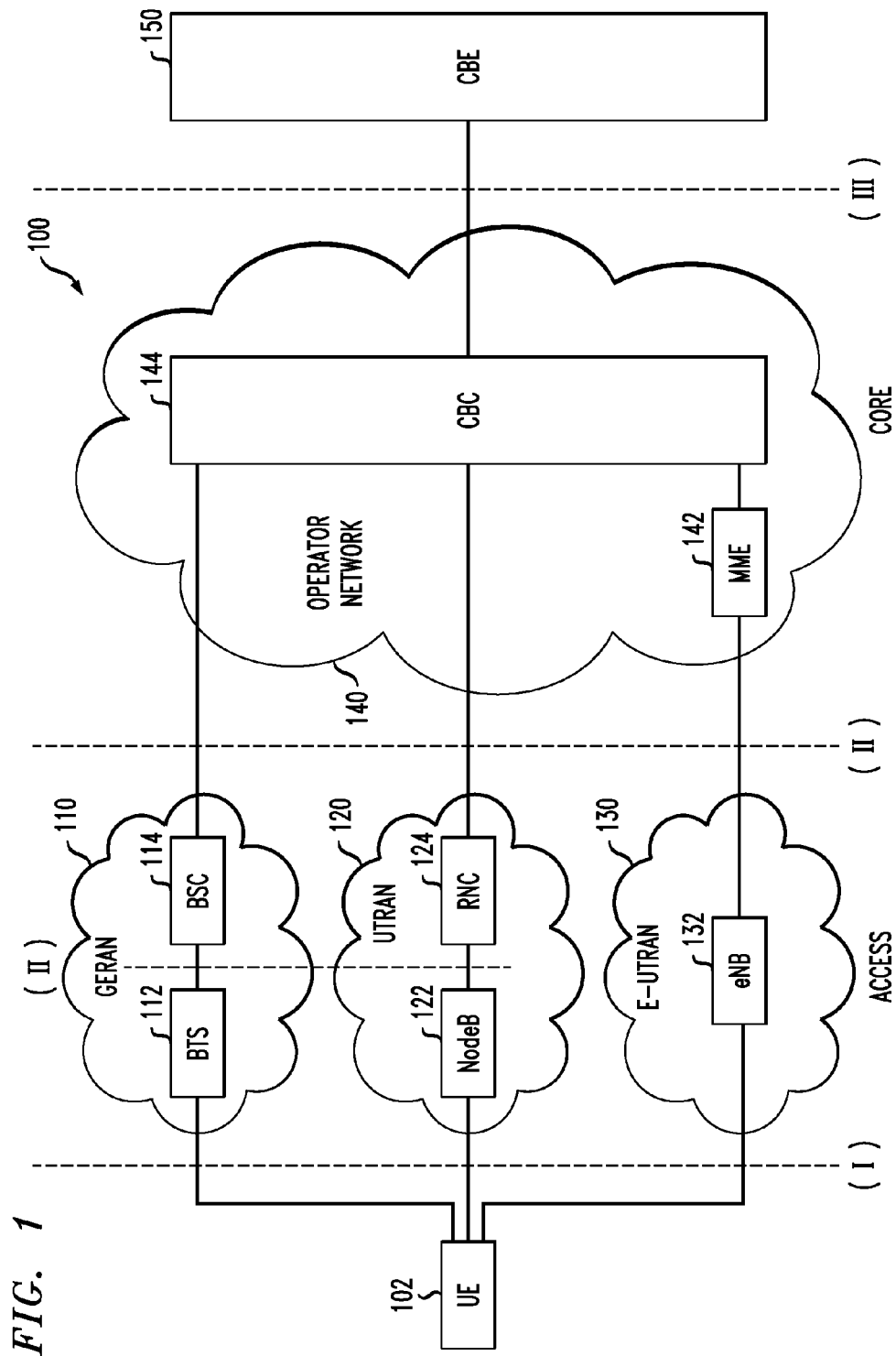
FIG. 1 is a diagram of a communication network according to an embodiment of the invention.

Illustrative embodiments of the invention will be described herein in the context of a public warning system (PWS) such as the PWS described in the above-referenced 3 GPP™ TS 22.268. While embodiments of the invention may be well suited for implementation in accordance with TS 22.268, such as in a Long Term Evolution (LTE™) communication network, it is to be appreciated that alternative embodiments of the invention can be implemented in other computing environments and communication networks, and with public warning systems other than the ones mentioned in TS 22.268.

As used herein, an "entity," with respect to a source of warning notification messages of a public warning system, refers to a private or public agency or authority that creates and disseminates one or more warning notification messages associated with the public warning system.

As used herein, a "control plane" refers to a functional layer of a communication network protocol stack whose functions include one or more of discovery, routing, path computation, signaling, or the like, with regard to computing devices in the communication network. Thus, a "control plane message" is a message that is generated and/or transmitted as part of the control plane of a protocol stack associated with a communication network in order to effectuate one or more of the above-mentioned control plane functions.

As used herein, a "network operator" (or "telecom operator") refers to a company that owns and operates a communication network (or parts thereof) and thus provides services to subscribers. Examples of network operators include, but are not limited to, AT&T™ and Verizon™.

As mentioned above, there has been an increasing desire and/or need to implement a PWS in accordance with communication networks such as, for example, mobile cellular networks. Thus, it is realized that user equipment (UE, or a mobile station (MS)) of such a network should have the capability of receiving PWS notifications within given notification areas through the mobile cellular network. The UE should also know what to do with such warnings including how to process and display any received warnings so as to alert the person or persons who possess the UE. Examples of a UE may include, but are not limited to, a mobile telephone, a smart phone, a portable computer, a tablet, a wireless email device, a personal digital assistant (PDA) or some other mobile computing device.

One example of a PWS, as described in TS 22.268, is the Commercial Mobile Alert System (CMAS) which delivers warning notification messages provided by warning notification providers to CMAS-capable UEs. The CMAS includes three different classes of warning notifications (i.e., Presidential, Imminent Threat, and Child Abduction Emergency). Another example of a PWS described in TS 22.268 is the Earthquake and Tsunami Warning System which delivers to the UEs warning notification messages specific to natural disasters, such as earthquakes and tsunamis, provided by warning notification providers.

In such PWSs, the UEs are capable of receiving primary and secondary warning notification messages through the communication network to which they are attached. It is understood that a primary warning notification message (or primary PWS message) is one that generally conveys a small amount of warning data (relative to the secondary warning notification message, for example, a few bytes) in an expedited manner so as to quickly convey the imminent occurrence of the subject event (e.g., natural disaster). A secondary warning notification message (or secondary PWS message) is one that generally conveys a large amount of warning data (relative to the primary warning notification message) to provide text and/or audio to instruct someone what to do and where to go in the emergency, as well as graphical data including maps to evacuation sites and time tables for food distribution, and the like.

Furthermore, TS 22.268 lays out some high level general requirements for warning notification delivery:

(i) The PWS shall be able to broadcast warning notifications to multiple users simultaneously with no acknowledgement required.

(ii) The PWS shall be able to support concurrent broadcast of multiple warning notifications.

(iii) Warning notifications shall be broadcast to a notification area which is based on the geographical information as specified by the warning notification provider.

(iv) The PWS-capable UEs (PWS-UE) in idle mode shall be capable of receiving broadcasted warning notifications.

(v) The PWS shall only be required to broadcast warning notifications in languages as prescribed by regulatory requirements.

(vi) Warning notifications are processed by the PWS on a first in, first out basis, subject to regulatory requirements.

(vii) The reception and presentation of warning notifications to the user shall not pre-empt an active voice or data session.

(viii) Warning notifications shall be limited to those emergencies where life or property is at imminent risk, and some responsive action should be taken. This requirement does not prohibit the use of the operator's network (i.e., broadcast technology) implemented for warning notifications to be used for commercial services.

TS 22.268 also lays out some high level general requirements for warning notification content:

(i) The PWS shall not modify or translate the warning notification content specified by the warning notification provider.

(ii) It is expected that warning notifications would likely include the following five elements: (1) event description; (2) area affected; (3) recommended action; (4) expiration time (with time zone); and (5) sending agency.

(iii) Additional content elements may be present, based on regulatory requirements.

(iv) There is a concern that uniform resource locators (URLs) or telephone numbers in a warning notification could exacerbate wireless network congestion at a time when network traffic is already dramatically increasing as individuals contact police, fire, and rescue personnel, as well as their loved ones. Therefore, warning notifications according to TS 22.268 should not contain anything that would drive immediate and debilitating traffic loads into the Public Land Mobile Network (PLMN) such as URLs or dial-able numbers.

Further, TS 22.268 lays out some high level general requirements for security associated with warning notification content:

(i) The PWS shall only broadcast warning notifications that come from an authenticated and authorized source.

(ii) The integrity of the warning notification shall be protected.

(iii) The PWS shall protect against false warning notification messages.

Thus, it is realized that one important requirement for the PWS is the desire/need to verify the authenticity of the primary and the secondary PWS messages received over the communication network. Such verification is possible by protecting the integrity of the PWS messages by a private key (PrK) of the source of the PWS messages. The source may, for example, be one or more computing devices associated with an entity such as a government or private agency tasked in a given geographic or municipal locale to generate and disseminate PWS messages.

In order to verify the authenticity of a PWS message, the UE has to have the public key (PuK) of the PWS message source. While such public key is not secret, its distribution is an important task, since there may exist more than one authorized PWS source (e.g., Hurricane Center, Seismic Activity Authority, Nuclear Safety commission, etc.) in any locale. In addition, the assumption is that PWS messages will be available to roaming UEs (as is known, roaming UEs are UEs that are not operating in their home network but rather are operating in a visiting network).

As will be explained further herein, embodiments of the invention utilize the entity identity (PWS source in the PWS case) to create the public key (PuK) of that entity. Use of identity based public key management allows for less complex key distribution, including ease in adding new PWS source public keys and in performing key revocation. Less complex key management leads to better and faster security procedures which need to happen prior to PWS message authentication. A less complex key revocation procedure provides better assurance that the PWS message is coming from an authenticated and authorized PWS source.

FIG. 1 shows a communication network 100 according to an embodiment of the invention. As shown, a UE 102 accesses communication network 100 via one of access networks 110, 120, and 130. Only one UE is shown for the sake of simplicity, however, it is understood that more than one UE can access communication network 100. It is also to be understood that UE 102 may be configured to be able to communicate with all three access networks shown in FIG. 1.

Access network 110 is a GSM Edge Radio Access Network (GERAN, where GSM refers to a Global System for Mobile communications) and includes a base transceiver station (BTS) 112 and a base station controller (BSC) 114, as is known in the art. Access network 120 is a UMTS Terrestrial Radio Access Network (UTRAN, where UMTS refers to a Universal Mobile Telecommunications System) and includes a base station (NodeB) 122 and a radio network controller (RNC) 124, as is known in the art. Access network 130 is an Evolved UTRAN network (E-UTRAN) and includes a base station (eNB) 132, as is known in the art. It is understood that access networks 110, 120, and 130 can have multiple ones of the network elements shown, as well as other network elements not shown; however, for simplicity, only one of the above-mentioned network elements are shown in each access network.

Communication network 100, as depicted in FIG. 1, also includes a core network 140 which includes a mobility management entity (MME) 142 and a cell broadcast center 144, as is known in the art. Other network elements can be part of the core network.

Further, a cell broadcast entity (CBE) 150 is part of communication network 100. CBC 144 and CBE 150 are part of the PWS infrastructure. "Cell broadcast" refers to the ability to broadcast one or more messages to mobile stations (UEs) in a "cell" (as used in a mobile cellular network). In the case of a PWS, the messages are the warning notification messages described above.

CBE 150 may represent, for example, the entity that is the source of the warning notification messages. CBC 144 is the network element that then distributes the messages. However, in the case of the E-UTRAN access network 130, MME 142 receives these messages from CBC 144 and distributes them to the E-UTRAN access network 130 which then forwards them to the UEs.

The protocols between CBC 144 and network elements of the access networks are defined in 3 GPP™ TS 48.049, TS 25.419 and TS 23.401, the disclosures of which are incorporated by reference herein.

Embodiments of the invention provide an identity based approach to managing the public keys needed to authenticate warning notification messages (e.g., primary and secondary messages as described above) received by a UE from a PWS source.

Identity-based encryption (IBE) protocols have been proposed as alternative methods to conventional public key protocols which require the existence of Public Key Infrastructure. The basic idea behind IBE is that the public key is derived from the identity that is associated with this key, where the derivation is a well-known mathematical function. Therefore, there is no need for binding an entity's identity with a public key through the use of certificates, since the public key is inherently derived from the identity, using a known algorithm. Note that with IBE, messages are encrypted with the IBE public key of the recipient. The latter is the only entity that can decrypt these messages, using an associated (to its identity) private key that is known only to the recipient. This private key is generated by a trusted third party called Private Key Generator (PKG) which executes a Key Generation Function (KGF). Therefore, with IBE, any requirement for identity verification using certificates that are managed by large public key infrastructures becomes obsolete. The only cryptographic material that is required by the message sender for IBE-encrypting a message is a set of publicly known cryptographic parameters that are needed for generating the public key of the recipient.

An identity-based encryption protocol was presented by Boneh and Franklin, see Dan Boneh, Matthew K. Franklin, "Identity-Based Encryption from the Weil Pairing" Advances in Cryptology—Proceedings of CRYPTO 2001 (2001), the disclosure of which is incorporated by reference herein. This asymmetric cryptographic encryption protocol allows participants to use an 'identity' (example: email-id, or domain name) as the public key and eliminates the need for large scale public key infrastructure which is often associated with public key encryption methods such as RSA (Rivest, Shamir and Adleman). Boneh and Franklin's approach to the problem uses bilinear maps on an elliptic curve over a finite field, and relies on the bilinear decisional Diffie-Hellman problem.

The protocol involves the following mathematical tools and parameters:

Let E be an elliptic curve over a finite field F, and let P be a point of large prime order.

Let $e: E \times E \rightarrow G$ be a bi-linear map on E. The typical example is the Weil pairing, and hence G will be the group of n-th roots of unity where n is a function of the number of points on E over F.

Let s be a non-zero positive integer and be a secret stored in a Key Generation Function (KGF). This is a system-wide secret and not revealed outside the KGF.

Let $P_{pub}=sP$ be the public key of the system that is known to all participants. Recall sP denotes a point in E, since E is a group.

Let $H_1$ be a known hash function that takes a string and assigns it to a point on the elliptic curve, i.e., $H_1(A)=Q_A$ on E, where A is usually the identity, and is also the public key of A.

Let $d_A=sQ_A$ be the private key computed by the KGF and delivered only to A.

Let $H_2$ be a known hash function that takes an element of G and assigns it to a string.

Let m be a message that has to be encrypted and sent to A. The encryption function described by Boneh and Franklin is as follows:

Let $g_A=e(Q_A, P_{pub})$, and let r be a random number.

$Encryption_A(m)=(rP, m\ xor\ H_2(g_A^r))$; in other words the encryption output of m has two coordinates u and v where $u=rP$ and $v=m\ xor\ H_2(g_A^r)$. Note that "xor" refers to the exclusive OR logic function.

In order to decrypt (u,v), A recovers m using the following formula:

$m=v\ xor\ H_2(e(d_A,u))$.

The proof of the formula is a straight forward exercise in bilinear maps, and the fact A has the secret $d_A$ (private key known only to A but not other participants). Also observe that the KGF, which computed $d_A$ in the first place, can also decrypt the message resulting in the KGF being a de-facto key escrow server.

In addition to the above-described example, it is to be understood that other forms of IBE are known.

As a result, using IBE principles, parties may verify signatures with no prior distribution of keys between individual participants. This is extremely useful in cases where pre-distribution of authenticated keys is inconvenient or infeasible due to technical restraints. However, to sign messages, the authorized user must obtain the appropriate private key from the PKG. A caveat of this approach is that the PKG must be highly trusted, as it is capable of generating any user's private key and may therefore sign messages without authorization.

Embodiments of the invention utilize principles of IBE in accordance with verification of PWS warning notification messages. More particularly, embodiments use the identity of a given PWS source to generate the public key (PuK) of that source, which is then used to verify a message as having come from that source based on the message having been digitally signed using the corresponding private key of the source. It is to be understood that the public key cryptographic operation of verification of a digitally-signed message using a public and private key pair is well known in the art, and not further described herein.

Furthermore, it is understood that key management comprises of key distribution and key revocation. In the case of public key cryptography, it is the revocation task which may typically presents a challenge. However, ease of the key revocation procedure is among the IBE advantages, compared to regular key management.

In the simplest case when no other parameters are needed, the PWS source's identity (e.g., Marine_and_hurricane_at Yucatan_Peninsula) can be used to generate the PuK of the PWS source. This identity can also be concatenated with the PuK expiration date, thus eliminating the need for a complex scheme for PuK revocation. It can also be concatenated with the service area identifier (ID) or message expiration time, providing a higher granularity of PWS public keys.

Advantageously, observe that in this case, the source of the PWS message signs the message using its private key. The recipient of the PWS message, upon reception, verifies the signature using the PuK (i.e., identity) of the source of the PWS message.

It is also to be appreciated that messages transferred between a PWS source and a UE, while not required, may be encrypted. One example of an encryption protocol that may be used is an identity-based encryption protocol.

FIG. 2A is a diagram of a methodology 200 for managing public key distribution according to an embodiment of the invention. Methodology 200 illustratively shows the distribution of a public key associated with a key generation function (PU-KGF) in association with a control plane message (in this case, a NAS SMC message) in the context of the E-UTRAN access network 130 (FIG. 1). Methodologies for access networks 110 and 120, as well as other access networks, may be the same or similar.

It is to be appreciated that the KGF can be implemented in a given network as a secure database, e.g., managed by a Private Key Generator (PKG). The KGF (PKG) could be part of the MME 142 (FIG. 1) or some other network element. By receiving PU-KGF, this allows the UE 102 to authenticate a local and/or centralized KGF in order to obtain the list of local PWS sources with the appropriate key material for each source. The key material can be obtained from the KGF directly or through some other network element, e.g., MME. The point is that the key material is protected using the KGF public-private key pair. This key material for each PWS source, along with unique identifiers (identities) of each source (received in a manner as will be described below in the context of FIG. 2C), is sufficient for the UE 102 to derive public keys per every PWS source in every locale. That is, the KGF provides the UE with key material which, together with the PWS source identities (explained further below), allow the UE to derive a public key for each PWS source, e.g., one public key per PWS source from the list of PWS identities (e.g., PWS_ID1, PWS_ID2, etc.).

As shown in FIG. 2A, in an initial attach or TAU (tracking area update) procedure depicted as step 202, UE 102 sends the initial attach request to MME 142 through eNB 132. EPS Authentication and Key Agreement (AKA) procedure can take place between UE 102 and MME 142 in step 204, as shown. EPS stands for Evolved Packet System which is the name given to the radio network of the E-UTRAN.

In step 206, the MME 142 associates (e.g., inserts, attaches, appends, merges, combines, or the like) the PU-KGF with the NAS SMC message and transmits the message with the KGF public key to eNB 132, which then forwards the message with the KGF public key to UE 102 in step 208. Upon receiving the NAS SMC message in step 208, UE 102 saves the PU-KGF sent from MME 142 via the NAS SMC message. It is to be appreciated that the NAS SMC message is typically used by the MME to initialize an NAS signaling security context between the UE and the MME. The NAS SMC message can also be used to change the NAS security algorithms for a current EPS security context in use.

Advantageously, embodiments of the invention are utilizing the NAS SMC message (more generally, a control plane message) to convey PU-KGF to the UEs that are operating in a given notification area (e.g., roaming and home-based UEs). The UE will then be able to verify that the key material for each PWS source that it receives from the KGF comes from an authentic source.

In steps 210 and 212, UE 102 sends an NAS SMC complete message back to MME 142 through eNB 132. The NAS SMC complete message typically includes the UE's IMEISV (International Mobile Equipment Identity Software Version). Then, in step 214, UE 102 is notified of the acceptance of the attach or TAU request by MME 142.

FIG. 2B is a diagram of an example of a control plane message according to an embodiment of the invention. More particularly, FIG. 2B shows a message format 220 for the NAS SMC message generated and transmitted by the MME 142 (in step 206 of FIG. 2A) and forwarded to UE 102 (in step 208 of FIG. 2A). As shown, content elements 222 through 240 (i.e., Protocol discriminator 222, Security header type 224, Security mode command message identity 226, Selected NAS security algorithms 228, NAS key set identifier 230, Spare half octet 232, Relayed UE security capabilities 234, IMEISV request 236, Replayed nonce$_{UE}$ 238, and Nonce$_{MME}$ 240) are described in 3 GPP™ TS 24.301, the disclosure of which is incorporated by reference herein. The additional content added to (more generally, associated with) the message is PU-KGF 242. It is to be appreciated that PU-KGF 242 can, for example, in alternative embodiments, be part of the spare half octet 232 or can be added to the SMC payload.

It is to be appreciated that in an alternative embodiment, the PU-KGF may be procured by the UE via a PLMN operator Universal Integrated Circuit Card (UICC) distribution channel.

FIG. 2C is a diagram of a methodology 250 for managing public warning system identity distribution according to an embodiment of the invention. As shown in FIG. 2C, the identities of the PWS sources are loaded in the UE by way of an unprotected Cell Broadcast Service (CBS) message. CBS is described in 3 GPP™ TS 23.041, the disclosure of which is incorporated by reference herein. When such a list of PWS sources, and the corresponding PWS source key material obtained from KGF, is stored in the UE, this is sufficient to authenticate PWS messages signed with private keys of PWS sources.

As shown, in step 252, MME 142 forwards a Write-Replace request message to eNodeB 132. This message contains the identities of the PWS sources in the given area. The MME can use a Tracking Area ID (identifier) list to determine the eNodeBs in the delivery area. If the Tracking Area ID list is empty, the message is forwarded to all eNodeBs that are connected to the MME.

In step 254, the Cell Broadcast Service delivers a CBS message via eNodeB 132 to UE 102. This message contains the identities of the PWS sources in the given area. Multiple attempts can be made since this message delivery method is not guaranteed.

In step 256, eNodeB 132 sends a Write-Replace response message to MME 142. This notifies the MME of the attempt of the message delivery to UE 102.

From the Write-Replace response message returned by eNodeB 132, MME 142 in step 258 determines the success or failure of the delivery and creates a trace record.

Alternatively, it is to be appreciated that the PWS source identities could be pre-provisioned in the UE (in the mobile equipment or ME, or in the UICC).

Following the stages described above in the context of FIGS. 2A and 2C, UE 102 is able to verify the signature of any PWS warning notification message with the public key derived from the signing entity identifier, and the signature algorithm communicated in the PWS message itself.

FIG. 2D is a diagram of a methodology 260 for public key and identity management according to an embodiment of the invention. More particularly, methodology 260 depicts the steps UE 102 performs to be able to verify a PWS warning notification message.

In step 262, the UE obtains key material for at least one PWS source. This is accomplished after the UE securely obtains the public key of the KGF (FIG. 2A), which the UE uses to verify that the key material it subsequently receives is from an authenticated source, i.e., the KGF.

In step 264, the UE non-securely obtains an identity of the PWS source (FIG. 2C). Recall that this may be done through a CBS message.

In step 266, the UE computes a public key from the key material and the identity of the PWS source (using well-known IBE computations, as described above).

In step 268, the UE uses the public key to verify a warning notification message received from the PWS source that is digitally signed using a corresponding private key of the PWS source.

It is to be appreciated that the order in which the UE performs steps 262 and 264 is not necessarily critical to the methodology, i.e., the UE can receive the key material before the identity. This would be the case if the deployment scenario does not require unique key material per PWS source identity. However, by way of example only, if the key material received from the KGF has a unique expiration date per given PWS source identity embedded in it, then the UE should have the list of PWS sources identities prior to requesting key material from the KGF.

Figure 3:
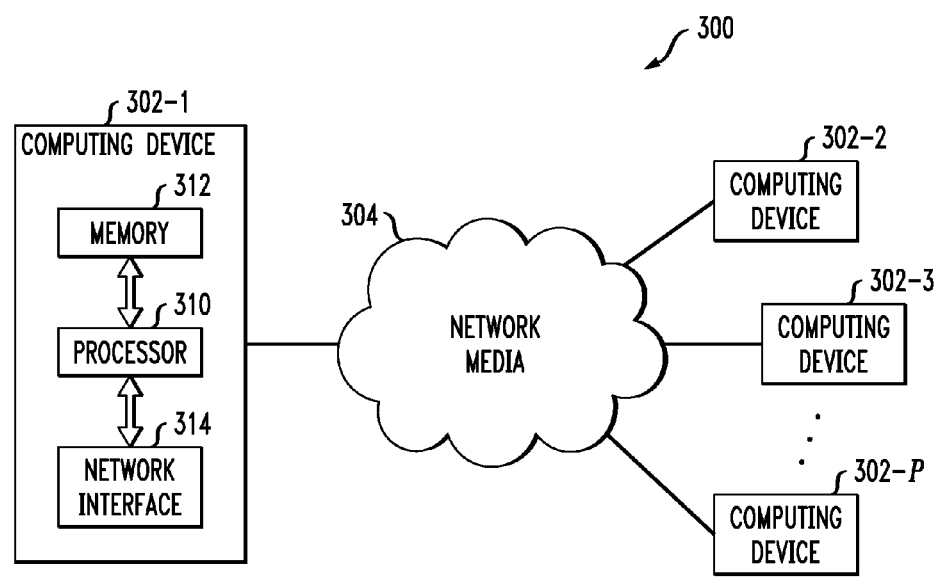
FIG. 3 is a diagram of an architecture of a communication network suitable for implementing public warning system public key and identity management according to an embodiment of the invention.

Lastly, FIG. 3 shows an architecture of a communication network 300 suitable for implementing PWS public key and identity management according to an embodiment of the invention.

As shown, computing devices 302-1, 302-2, 302-3, . . . , 302-P are operatively coupled via communication network media 304. The network media can include any network media across which the computing devices are capable of communicating including, for example, a wireless medium and/or a wired medium. By way of example, the network media can carry IP (Internet Protocol) packets end to end and may involve any of the communication networks mentioned above. However, the invention is not limited to any particular type of network medium.

It is to be understood that the computing devices shown in FIG. 3 represent the components described above in the context of FIGS. 1, 2A and 2C, i.e., UE 102 and the various network elements shown, BTS 112, BSC 114, NodeB 122, RNC 124, eNB 132, MME 142, CBC 144, and CBE 150. Two or more components in FIG. 1 can also share a computing device shown in FIG. 3.

As would be readily apparent to one of ordinary skill in the art, the computing devices in FIG. 3 may be implemented as programmed computers operating under control of computer program code. The computer program code would be stored in a computer (or processor) readable storage medium (e.g., a memory) and the code would be executed by a processor of the computer. Given this disclosure of the invention, one skilled in the art could readily produce appropriate computer program code in order to implement the methodologies and protocols described herein.

Nonetheless, FIG. 3 generally illustrates an exemplary architecture for each computing device communicating over the network media. As shown, computing device 302-1 comprises processor 310, memory 312, and network interface 314. Thus, each computing device in FIG. 3 may have the same or a similar computing architecture.

It should be understood that the term "processor" as used herein is intended to include one or more processing devices, including a signal processor, a microprocessor, a microcontroller, an application-specific integrated circuit (ASIC), a field programmable gate array (FPGA) or other type of processing circuitry, as well as portions or combinations of such circuitry elements. Also, the term "memory" as used herein is intended to include electronic memory associated with a processor, such as random access memory (RAM), read-only memory (ROM) or other types of memory, in any combination. Further, the phrase "network interface" as used herein is intended to include any circuitry or devices used to interface the computing device with the network and other network components. Such circuitry may comprise conventional transceivers of a type well known in the art.

Accordingly, software instructions or code for performing the methodologies and protocols described herein may be stored in one or more of the associated memory devices, e.g., ROM, fixed or removable memory, and, when ready to be utilized, loaded into RAM and executed by the processor. That is, each computing device shown in FIG. 3 may be individually programmed to perform their respective steps of the methodologies and protocols depicted in FIGS. 1, 2A and 2C.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
  obtaining, at a first computing device of a communication network, key material for at least one source of a message generated for a public warning system;
  obtaining, at the first computing device, an identity of the source; and
  computing, at the first computing device, a public key from the key material and the identity of the source such that the public key is useable by the first computing device to verify a message received from the source that is digitally signed using a corresponding private key of the source;
  wherein the source comprises a cell broadcast entity of a public warning system infrastructure;
  wherein the key material for the source is securely obtained by the first computing device from a second computing device of the communication network; and
  wherein the second computing device comprises a key generation function that is authenticated by the first computing device to obtain a list of public warning system message sources with corresponding key material for each source.

2. The method of claim 1, further comprising the first computing device obtaining a public key of the key generation function from a third computing device via a control plane message generated and transmitted by the third computing device.

3. The method of claim 2, wherein the control plane message comprises a non-access stratum security mode command message.

4. The method of claim 2, wherein the third computing device comprises a mobility management entity.

5. The method of claim 1, wherein the first computing device comprises user equipment.

6. The method of claim 1, wherein the identity of the source is non-securely obtained by the first computing device via a cell broadcast service message.

7. The method of claim 1, wherein the message received from the source that is digitally signed using a corresponding private key of the source is a warning notification message.

8. An article of manufacture comprising a processor-readable storage medium storing one or more software programs which when executed by a processor associated with the first computing device perform the steps of the method of claim 1.

9. An apparatus, comprising:
a memory; and
a processor operatively coupled to the memory to form a first computing device of a communication network, which is configured to:
obtain key material for at least one source of a message generated for a public warning system;
obtain an identity of the source; and
compute a public key from the key material and the identity of the source such that the public key is useable by the first computing device to verify a message received from the source that is digitally signed using a corresponding private key of the source;
wherein the source comprises a cell broadcast entity of a public warning system infrastructure;
wherein the key material for the source is securely obtained by the first computing device from a second computing device of the communication network; and
wherein the second computing device comprises a key generation function that is authenticated by the first computing device to obtain a list of public warning system message sources with corresponding key material for each source.

10. The apparatus of claim 9, wherein the processor of the first computing device is further configured to obtain a public key of the key generation function from a third computing device via a control plane message generated and transmitted by the third computing device.

11. The apparatus of claim 10, wherein the control plane message comprises a non-access stratum security mode command message.

12. The apparatus of claim 10, wherein the third computing device comprises a mobility management entity.

13. The apparatus of claim 9, wherein the first computing device comprises user equipment.

14. The apparatus of claim 9, wherein the identity of the source is non-securely obtained by the first computing device via a cell broadcast service message.

15. The apparatus of claim 9, wherein the message received from the source that is digitally signed using a corresponding private key of the source is a warning notification message.

16. The apparatus of claim 9, wherein the key material comprises a public key expiration date.

* * * * *